(12) United States Patent
Marque-Pucheu et al.

(10) Patent No.: US 10,771,511 B2
(45) Date of Patent: Sep. 8, 2020

(54) COMMUNICATION METHOD TO MAINTAIN AN APPLICATION SESSION BETWEEN A TERMINAL AND AN APPLICATION SERVER

(71) Applicant: AIRBUS DS SLC, Elancourt (FR)

(72) Inventors: Gérard Marque-Pucheu, Verneuil (FR); Olivier Paterour, Guyancourt (FR); Arthur Lallet, La Flamengrie (FR)

(73) Assignee: AIRBUS DS SLC, Elancourt (FR)

( * ) Notice: Subject to any disclaimer, the term of this patent is extended or adjusted under 35 U.S.C. 154(b) by 180 days.

(21) Appl. No.: 15/915,862

(22) Filed: Mar. 8, 2018

(65) Prior Publication Data
US 2018/0262537 A1 Sep. 13, 2018

(30) Foreign Application Priority Data

Mar. 8, 2017 (FR) ...................................... 17 51906

(51) Int. Cl.
*H04L 29/06* (2006.01)
*H04L 29/08* (2006.01)
(Continued)

(52) U.S. Cl.
CPC .......... *H04L 65/1069* (2013.01); *H04L 12/66* (2013.01); *H04L 61/256* (2013.01);
(Continued)

(58) Field of Classification Search
CPC . H04L 65/1069; H04L 12/66; H04L 61/2553; H04L 61/256; H04L 61/2564;
(Continued)

(56) References Cited

U.S. PATENT DOCUMENTS 8,451,711 B1 * 5/2013 O'Toole, Jr. ........ H04L 67/2814
370/216
9,077,709 B1 * 7/2015 Dall .................... H04L 63/0823
(Continued)

FOREIGN PATENT DOCUMENTS

EP 1 441 483 A2 7/2004

OTHER PUBLICATIONS

Search Report as issued in French Patent Application No. 1751906, dated Nov. 28, 2017.

*Primary Examiner* — Nasser M Goodarzi
*Assistant Examiner* — Adil Ocak
(74) *Attorney, Agent, or Firm* — Pillsbury Winthrop Shaw Pittman LLP

(57) ABSTRACT

A method of communication between a first communicating entity and an application server, includes establishing a first sequence of exchanges of candidates; generating a first transmission channel establishing a first application session; detecting by a first communicating entity a new access network including a second gateway, resulting in the establishment of a second sequence of exchanges of new candidates; automatic configuring the configurable gateway so as to modify the correspondence between the source address of the second NAT gateway with the peer reflexive address of the NAT gateway which is configurable from the history of the candidates sent by the communicating entity; generating a second transmission channel maintaining the first application session.

7 Claims, 5 Drawing Sheets

(51) Int. Cl.
*H04L 29/12* (2006.01)
*H04L 12/66* (2006.01)

(52) U.S. Cl.
CPC ...... *H04L 61/2553* (2013.01); *H04L 61/2564* (2013.01); *H04L 61/2575* (2013.01); *H04L 61/2589* (2013.01); *H04L 65/1006* (2013.01); *H04L 65/1063* (2013.01); *H04L 67/145* (2013.01); *H04L 67/148* (2013.01); *H04L 61/2514* (2013.01)

(58) Field of Classification Search
CPC ............. H04L 61/2575; H04L 61/2589; H04L 65/1006; H04L 65/1063; H04L 67/145; H04L 67/148
See application file for complete search history.

(56) References Cited

U.S. PATENT DOCUMENTS

| | | | |
|---|---|---|---|
| 2010/0241710 A1* | 9/2010 | Renfroe | H04L 61/2575 709/204 |
| 2010/0312880 A1* | 12/2010 | Veits | H04L 29/12528 709/224 |
| 2016/0234164 A1 | 8/2016 | Kweon et al. | |

* cited by examiner

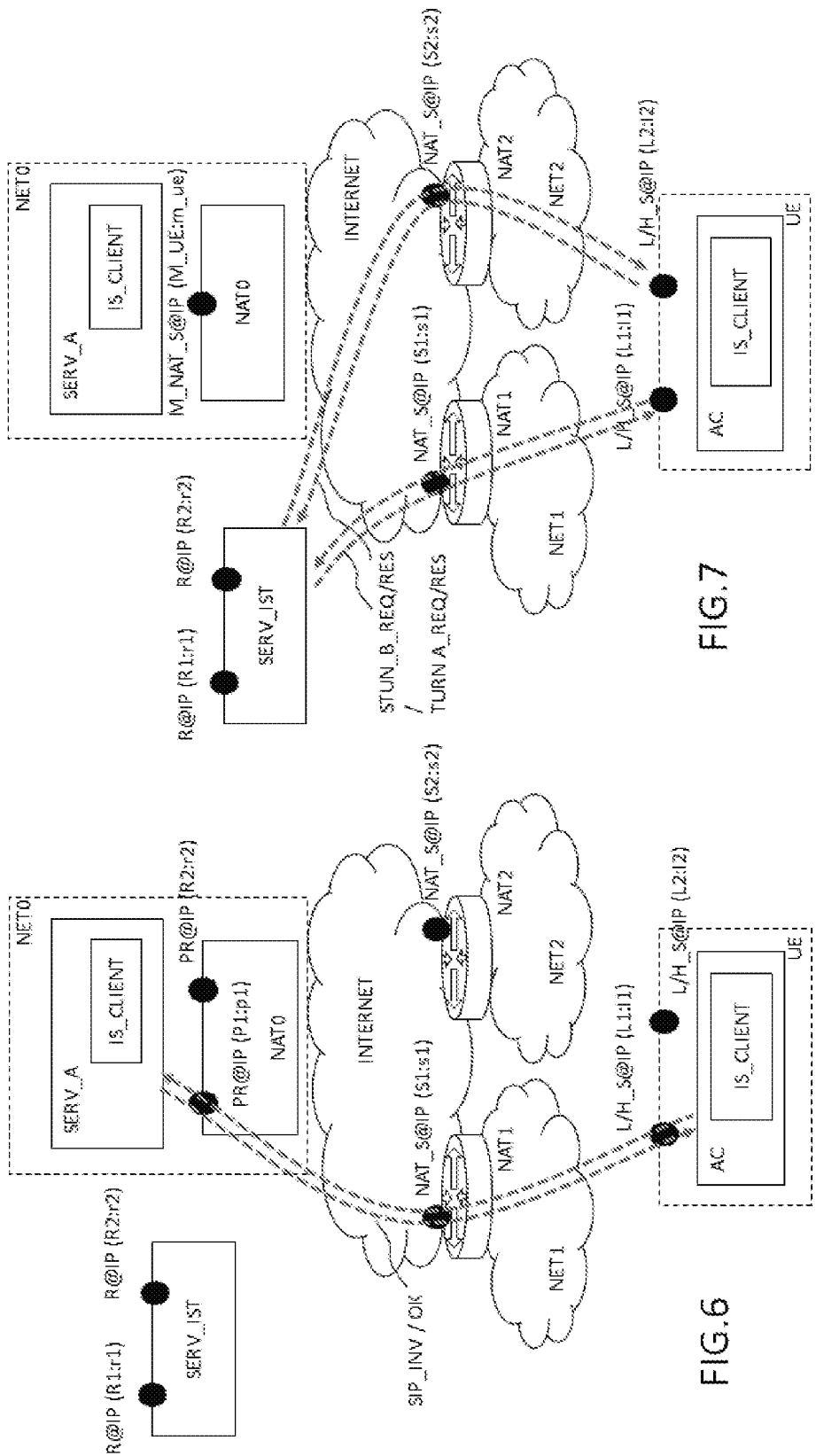

COMMUNICATION METHOD TO MAINTAIN AN APPLICATION SESSION BETWEEN A TERMINAL AND AN APPLICATION SERVER

CROSS REFERENCE TO RELATED APPLICATIONS

This application claims priority to French Patent Application No. 1751906, filed Mar. 8, 2017, the entire content of which is incorporated herein by reference in its entirety.

FIELD

The field of the invention relates to communication methods and systems providing operational continuity when a user terminal switches from one network to another. More specifically, the field of the invention relates to the dynamic reconfiguration of a NAT gateway to ensure continuity of certain communication services between two communicating entities.

BACKGROUND

Currently, techniques for establishing communication between two communicating entities exist and are deployed within communication networks, for example between two user terminals, between communicating applications deployed on equipment of a network or between a user terminal and an application server.

However, direct communications between different communicating entities over the Internet network are difficult to implement due to the complexity of the network architectures deployed and the many private or local networks through which the communicating entities access the Internet network. This difficulty results in particular from the use of protocols constituting hindrances to the implementation of point-to-point dynamic connections. For example, NAT gateways converting local addresses of a local network into public addresses on the Internet network, and vice versa, do not allow efficient implementation of the establishment of such point-to-point connections. Indeed, the consequence of implementing of a NAT gateway to access other networks is that it masks the addresses of the equipment of a local network and in particular of clients and services accessible from the local network.

To mitigate these difficulties, Interactive Connectivity Establishment, abbreviated to ICE, is known, which enables communication routes to be defined between point-to-point communicating entities, taking into account the architecture of NAT gateways.
This technique is used, in particular, for Voice over IP protocols, abbreviated as VoIP, transmission of video streams, or instant message transmissions. The ICE technique is often associated with the STUN (RFC5389) and TURN (RFC 5766) protocols. The STUN and TURN protocols refer respectively to Session Traversal Utilities for NAT and Traversal Using Relays around NAT. These are protocols which allow the implementation of NAT techniques when a discovery of addresses is required, or when a relaying third party is required to overcome the difficulties, for example, of implementation of a Firewall with a NAT technique.

One problem arises from the fact that a point-to-point connection established between two services or two clients of two devices in different networks connected to the Internet network usually implies in the case of certain media an indication of a communication port which depends on the type of media. Although a NAT gateway enables correspondences of addresses of a local/private network to a public network to be made, and vice versa. Indeed, a NAT gateway does not necessarily manage the reassignments of the ports when the addresses of the headers of the transmitted messages change, since these messages are indicated in the bodies of the exchanged messages. This is the case, in particular, when a NAT gateway is used with the SIP protocol, where this acronym stands for Session Initialisation Protocol.

A STUN server enables data relating to the various types of public and local addresses and the port numbers to be exchanged between two communicating entities in order that the latter can communicate through NAT gateways and with different application resources.

Today, ICE techniques associated with the STUN and TURN protocols have mechanisms to reconstruct application sessions when a device is disconnected or when switching from one network to another. One advantage of these mechanisms is that they allow a certain mobility of a terminal, whilst ensuring independence relative to the network architecture. In particular, these mechanisms are independent of the network architecture, in particular the architecture of NAT gateways or firewalls, in order to make data communications immune from the path taken by the data packets.

However, when a terminal which is communicating with an application server changes access networks to an Internet network, or when it is disconnected and reconnected to a same local network, a disadvantage of the above techniques is that the application session must be reconfigured between the terminal and the application server. Even if the data transmission channels are re-established, it is nonetheless the case that this is particularly problematic when switching from a first access network to a second access network, in particular when a user is mobile and wishes its application session to be maintained.

It will be understood that since reconfiguration of an application session between two communicating entities generally requires initialisation and preliminary data exchanges, this implies that latency times are made longer and that the offered services are discontinuous. As an example, the VoIP protocol requires a reconfiguration of the application session as rapidly as possible, bearing in mind the real-time constraints. Consequently, the mechanisms for reconstructing application sessions, although useful, appear insufficient to guarantee quality of service for a given user. One choice can be not to switch networks for as long as an application session is established, meaning that consideration of the new access network is disregarded.

SUMMARY

Aspects of the invention seek to resolve the above-mentioned disadvantages. According to one aspect, the invention concerns a method of communication between a first communicating entity connected to a first network through a first NAT gateway of a first local network and an application server, where the application server is associated with a configurable NAT gateway NAT0 enabling at least one address of at least the first NAT gateway to be made to correspond to at least one public address of the first communicating entity, called a peer reflexive address, comprising the following steps:
  Establishment of a first sequence of exchanges of candidates, where the candidates comprise at least one IP address and one port, comprising:

Collection of candidates by the first entity from a server using the ICE, STUN or TURN protocols in order to be reached by a remote server through the first NAT gateway;

Exchange of candidates between the first entity and the application server resulting in transmission of the peer reflexive address between the configurable NAT gateway and the first gateway;

Transmission to the application server by the first entity of a history of candidates attributed to the first entity;

Verification of the channels between peers of candidates established between the first entity and the application server;

Generation of a first transmission channel establishing a first application session;

Detection by the first communicating entity of a new access network comprising a second NAT gateway or of a reconnection to the first access network after a disconnection, resulting in the establishment of a second sequence of exchanges of new candidates comprising steps similar to the first sequence;

Automatic configuration of the configurable gateway by a function of the application server so as to modify the correspondence between the source address of the first or second NAT gateway with the peer reflexive address of the NAT gateway which is configurable from the history of the candidates sent by the communicating entity;

Generation of a second transmission channel between the first communicating entity and the application server ensuring that the first application session is maintained.

One benefit is that operational continuity of an application can be guaranteed, due to the fact that an application session is maintained. The invention is particularly applicable in two cases:

when a communicating entity is disconnected for any network-related reason and when reconnection is necessary. The above configuration enables to an application session which was already configured to be re-established without having to re-initialise a new application session;

when a communicating entity detects a new network and when an indication is received or a decision is taken to continue a communication previously established on a first network to the new detected network. In this configuration, the communication is maintained through the new network without reinitialising the pre-existing application session.

According to one implementation, the candidates comprise, in addition to an IP address and a port number:

An application identifier and/or;

An SIP identifier.

According to one implementation, the application session comprises an application identifier of the communicating entity associated with an application identifier of the application server, where maintenance of an application server implies that the association of the application identifiers is maintained.

According to one implementation, the establishment of the first and second sequences of exchanges of candidates comprise, in succession:

An exchange of candidates of a signalling protocol between the communicating entity and the application server;

An exchange of candidates of an application protocol between a client of the communicating entity and a client of the application server;

An exchange of candidates of a routing protocol between the first or the second NAT gateway and the configurable gateway.

According to one implementation, the NAT gateway comprises a clock enabling the periods over which no data is transmitted in the transmission channel to be determined, where the periods enables a priority indicator, assigned to a candidate stored in the gateway and associated with a terminal to be generated.

According to another aspect, the invention concerns a communication system comprising an application server comprising at least one application client and one configurable NAT gateway, where the application server is able to undertake an exchange of candidates with a remote communicating entity following a request through the NAT gateway, where the configurable NAT gateway attributes a public address to the application server, called a peer reflexive address, where this address is associated with the remote communicating entity, so as to establish a first transmission channel ensuring that a first application session is established, characterised by the fact that a new request for exchange of candidates comprising a history of the previous candidates received from a same communicating entity to the application server results in a configuration of the configurable NAT gateway, so as to modify the association between at least one transmitted candidate and the peer reflexive address of the configurable NAT gateway, and where the system establishes a second transmission channel between the communicating entity and the application server maintaining the first application session.

According to another aspect, the invention concerns a communicating entity comprising at least one radio or network module enabling data to be transmitted over at least one interface of the terminal connected to a network, where the communicating entity comprises a memory in which a history of candidates is recorded and associated with an application server, where the candidates are, for example, collected from a server implementing one of the ICE, STUN or TURN protocols, where the communicating entity comprises at least one calculator to insert in at least one frame of a SIP protocol a data field comprising the history of the collected and memorised candidates, as soon as a transmission channel is generated between the terminal and an application server, and where the communicating entity comprises two modems enabling the presence of at least two access networks to be detected, and two transmission channels to be generated in parallel, in which an application session established between the user terminal and an application server switches from one transmission channel to another whilst keeping the same session identifier.

BRIEF DESCRIPTION OF THE FIGURES

Other characteristics and benefits of the invention will be seen clearly on reading the detailed description below, with reference to the appended figures, which illustrate:

FIG. 6: a communication architecture of FIG. 1 representing the validation of the sequence of exchange of candidates between two communicating entities;

FIG. 7: an example in which a communicating entity detects a second sub-network, and starts a sequence of collection of candidates according to the method of an embodiment of the invention;

DETAILED DESCRIPTION

The method of the invention is described below using an example implementing two communicating entities. Depending on the implementations, the communicating entities can be:
- two application servers;
- two user terminals;
- a user terminal and an application server.

In the remainder of the description the implementation of a data transmission channel between a terminal UE and an application server SERV_A is described in detail. In the implementation described below, terminal UE comprises a client AC for a given application, and application server SERV_A comprises a service for this given application. In this case the application is defined by the combined operation of the client and the associated service performing functions of a given application.

Other configurations are compatible with the invention; for example, when two services cooperate or two clients cooperate to perform a function of a given application. The invention also relates to cases in which the communicating entities comprise a plurality of services and clients. It will be understood that, depending on the envisaged configurations, application server SERV_A can comprise a client part.

Figure 1:
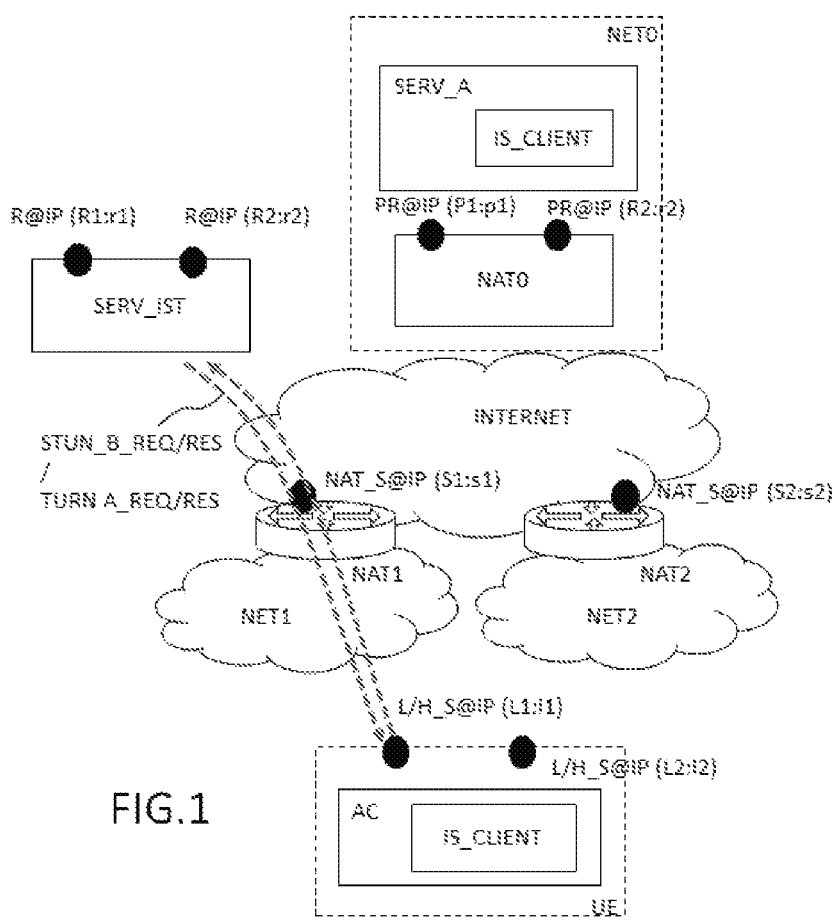
FIG. 1: a communication architecture illustrating the first step of collection of candidates of the method of the invention from a ICE/STUN/TURN server.

FIG. 1 represents an INTERNET network, to which the following are connected:
- a first local network NET1 from a first gateway NAT1;
- a second local network NET2 from a second gateway NAT2;
- a third local network NET0 from a second configurable gateway NAT0.
- an ICE/STUN/TURN server, noted SERV_IST, implementing at least one of the ICE, STUN or TURN protocols, and offering known services for allocation of candidates for devices in a local network which are visible and/or accessible by devices connected to the INTERNET network through an NAT gateway.

In this configuration illustrated in FIG. 1, an application server SERV_A is connected to the INTERNET network through local network NET0 through first gateway NAT0. Terminal UE is connected to the INTERNET network through a first local network NET and a gateway NAT1. In the remainder of the description, the case of detection by terminal UE of a second local network NET 2 connected to the INTERNET network through a second gateway NAT2 will be described in detail.

Terminal UE

A user terminal UE comprising a client AC is represented in FIG. 1. Client AC enables a plurality of functions of a given application to be performed. In order to communicate with a third party, the client interfaces with a client ICE/STUN, noted IS_CLIENT. This client enables information to be obtained, enabling a data transmission channel to be established with a third party. For example, IS_CLIENT enables an address and a port to be obtained from an NAT gateway so that it may be "seen" by a third party outside local network NET1. Client IS_CLIENT enables data transmission channels supporting an application session to be established, to ensure operation of an application implemented by the {Client; Service} pair.

A user terminal UE comprises, at minimum:
- a calculator enabling calculations, comparisons of message fields, correlations of values, etc. to be performed;
- a memory enabling parameters, identification data, etc. to be stored;
- at least one data interface associated with at least one radio or network module, enabling data to be transmitted over at least one connection.

According to one implementation, a terminal UE comprises two radio/network modules associated with two output interfaces of the terminal. This configuration enables, in particular, parallel connections to be established between, firstly, terminal UE, and secondly at least two NAT gateways, in order:
- to establish simultaneously different application sessions between, firstly, terminal UE, and secondly different application servers or;
- to allow switching from one transmission channel to another channel of an application session between terminal UE and a server SERV_A.

Each interface of terminal UE is associated with a local address attributed, for example, by a gateway NAT1 of a local sub-network NET1, or by network devices. FIG. 1 illustrates two local addresses attributed to two network interfaces of terminal UE: L/H_S@IP(L1:I1) and L/H_S@IP(L2:I2). These are attributed by the network, for example an LTE network. In the case of the example of FIG. 1, NAT1 attributes network address S1:s1 to the network interface of gateway NAT1.

The terminal can be a computer, a tablet, a smartphone, another server, a connected object or any other electronic device comprising an interface allowing connection to a data network, and an operating system enabling at least one communication protocol to be implemented.

Application Server

The second communicating entity, in the present description, is an application server noted SERV_A, comprising means to implement a plurality of functions, possibly of different applications. According to one example implementation, application server SERV_A enables a service of an application to be implemented. Application server SERV_A comprises a ICE/STUN client, noted IS_CLIENT, which enables information to be obtained, enabling data transmission channels to be established supporting at least one application session between the client of terminal UE and the service hosted by application server SERV_A.

According to one implementation, application server SERV_A is accessible via a configurable NAT gateway noted NAT0. The invention is compatible with an architecture comprising different cascading NAT gateways. The invention relates in particular to the following two cases:
- the case in which the server is connected to a local network NET0 accessible through at least one configurable NAT server;
- the case in which the server is connected directly to the Internet network, for example when the service is a WEB service.

In this latter case a candidate-management algorithm is implemented directly inside server SERV_A. In the remainder of the description, the implementation in which server SERV_A is connected to a configurable NAT gateway is described in detail.

Application server SERV_A comprises, at minimum:
- a calculator enabling calculations, comparisons of message fields, correlations of values, etc. to be performed;
- a memory enabling parameters, identification data, etc., to be stored
- at least one data interface associated with at least one radio or network module enabling data to be transmitted over at least one interface of the server.

When application server SERV_A is in a local network NET0 accessible via a configurable gateway NAT0, the latter enables at least one address @serv_a of application server SERV_A to be made to correspond with at least one public address, called a "peer reflexive address", noted AR-P.

ICE/STUN/TURN SERVER

To enable implementation of an application by application server SERV_A and by terminal UE from, respectively, a service and a client each hosted by the latter, the method of the invention comprises a sequence of collection of candidates from an ICE/STUN/TURN server.

The term "candidates" is used in the description to refer to all information or data relating to dynamic or static addressing or a set of identifiers, such as:
- addressing of a network device such as a server, a terminal, a gateway, a router or a switch;
- addressing of a client, whether it is executed on a terminal or on any other device.

In addition, according to one implementation of the invention, the following information can be transmitted with the candidates:
- the identifier of a service, whether it is executed on an application server or on any other device;
- The identifier of a signalling or routing protocol, or any other protocol enabling a transmission channel to be established between two devices.

The candidates can be collected, for example, by a terminal UE, in order to:
- configure the transmission of a message, giving the source address and a port in the header and the body of a transmitted frame;
- configure an interface or a client, such as client IS_CLIENT, in order to establish a transmission channel between different communicating entities accessible through NAT gateways;
- update a correspondence table of a NAT gateway or an Internet network router or a local network router.

Various implementations enabling certain aspects of the invention to be implemented according to the processing of the candidates collected by a communicating entity from a server SERV_IST.

Server SERV_IST comprises relay addresses for the implementation in which the TURN protocol is activated. They are noted in FIG. 1: R@IP(R1:r1) and R@IP(R2:r2).

Introduction to the Steps of the Method

Figure 2:
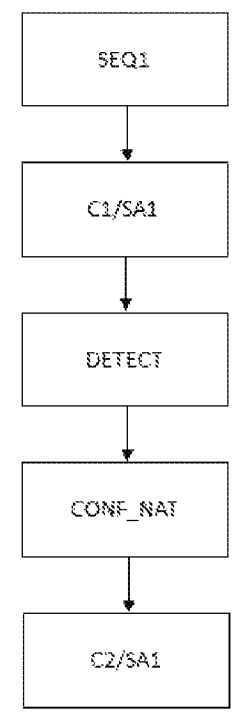
FIG. 2: the principal steps of the method of an embodiment of the invention.
Figure 3:
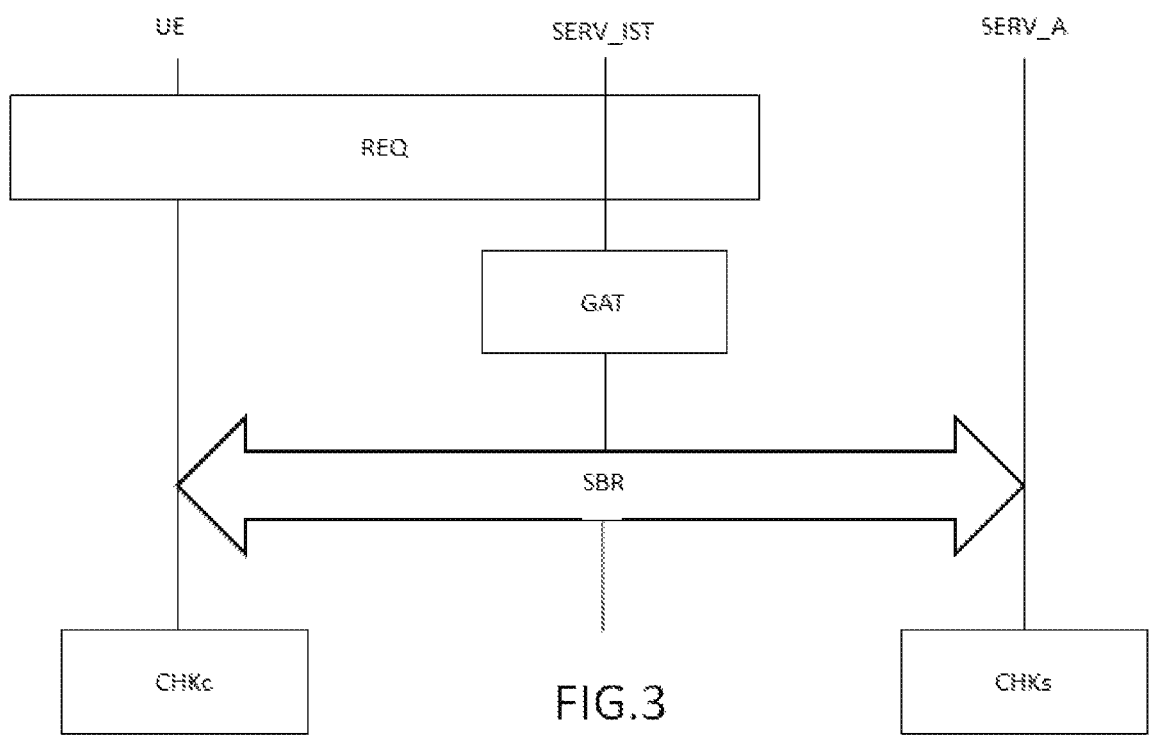
FIG. 3: the sequence of collection of candidates and exchange of them between two communicating entities.

FIG. 2 represents the main steps of the method of an embodiment of the invention. It comprises a first sequence SEQ1 of collection of candidates from server SERV_IST by terminal UE and by application server SERV_A. This first step is described in FIG. 3. FIG. 3 also illustrates the step of exchange of the candidates, and of validation of the connections established between two communicating entities.

Figure 5:
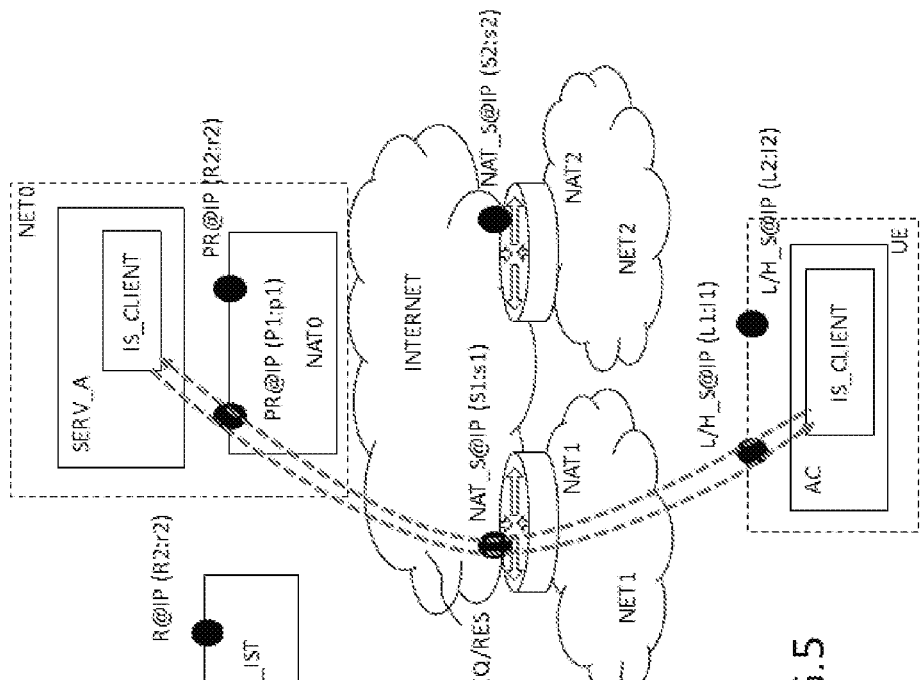
FIG. 5: a communication architecture of FIG. 1 representing the sequence of exchange of candidates of an application protocol between the two communicating entities.
Figure 4:
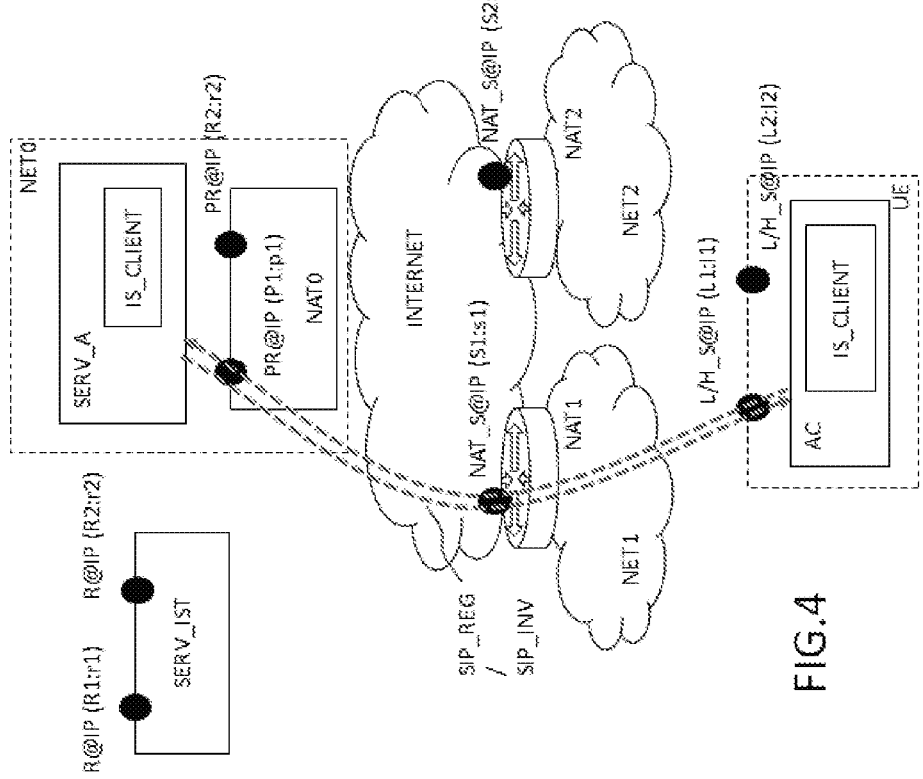
FIG. 4: a communication architecture of FIG. 1 representing the sequence of exchange of candidates of a signalling protocol between the two communicating entities.

The method then comprises a second step C1/SA1 of establishment of a transmission channel to establish an application session between terminal UE and application servers SERV_A; this may be, for example, a voice over IP service. This step is illustrated in FIGS. 4 and 5; it comprises the transmission of candidates collected by terminal UE from server SERV_A and a history of candidates collected by the terminal.

The method comprises a third step DETECT, in which the terminal detects:
- either a new local network NET2, in which it may switch at least one communication with a third party via a second NAT gateway of this second local network;
- or a disconnection and a reconnection to local network NET1, for example after a network-related disconnection such as, for example, when a disconnection from the LTE network occurs due to the fact that no signal is being received, or because a chronometer of the NAT gateway activates a disconnection after detecting inactivity over an established transmission channel.

This third step is illustrated by FIG. 7.

Figure 9:
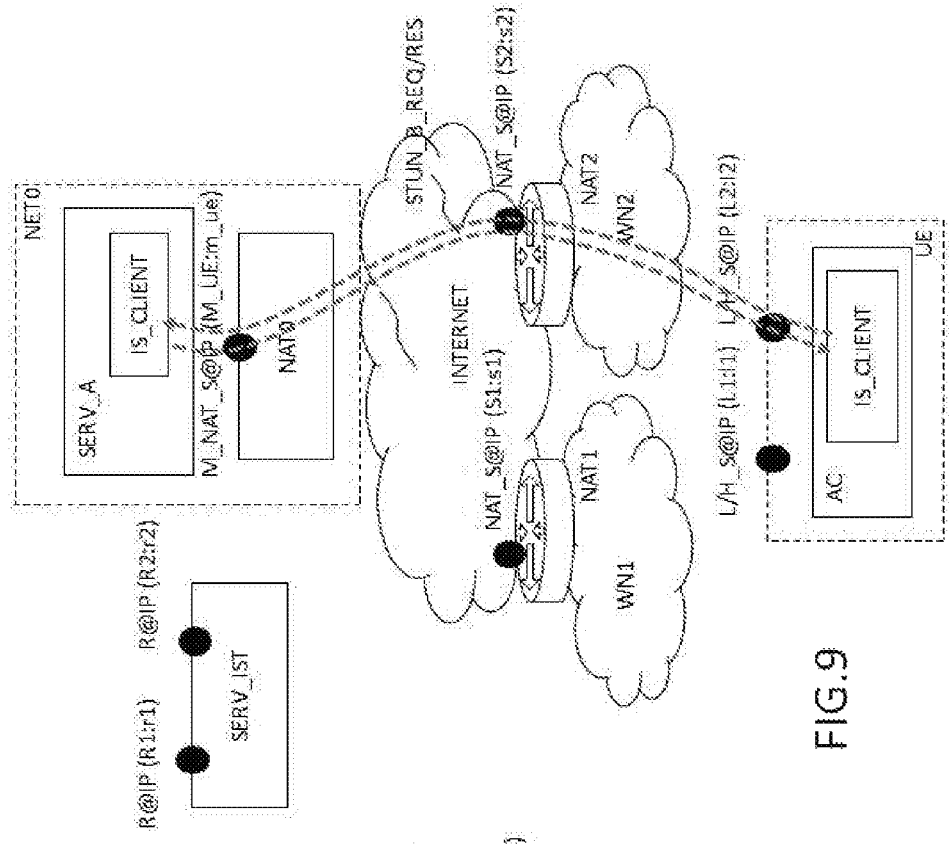
FIG. 9: a communication architecture of FIG. 7 representing the sequence of exchange of the candidates of an application protocol between the two communicating entities to communicate from the second discovered sub-network.
Figure 8:
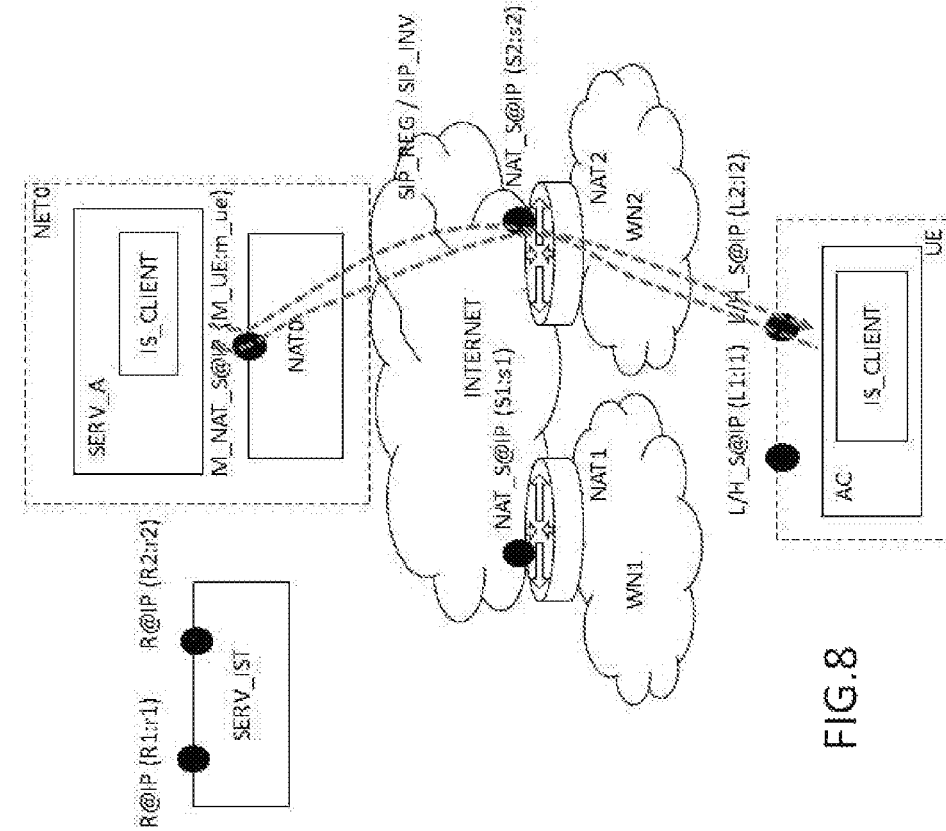
FIG. 8: a communication architecture of FIG. 7 representing the sequence of exchange of the candidates of a signalling protocol between the two communicating entities to communicate from the second discovered sub-network.

The method comprises a fourth step CONF_NAT, in which the NAT gateway is automatically configured to establish a transmission channel of application server SERV_A to terminal UE via a second local network NET2. This step is illustrated in FIGS. 8 and 9. In a general sense, reconfiguring the NAT gateway enables, for example, a SIP identifier or an identifier of an application session to be retained following a change of physical route in the network between two communicating entities. This can also apply to a disconnection and reconnection of terminal UE to a same sub-network.

A second transmission channel is established in a fifth step C2/SA1 after step CONF_NAT of configuration of the NAT gateway, although there is no modification of the candidates of the previously established application session from the point of view of server SERV_A, which still communicates with client IS_CLIENT with the same address attributed by NAT0. This step is illustrated in FIGS. 8 and 9.

Detailed Description of the Main Steps of the Method

First Step: SEQ1

Collection of the Candidates

FIG. 3 represents the main data exchange steps of a sequence SEQ1 called the "candidate exchange" sequence, between an ICE/STUN/TURN server and a terminal UE. Such a sequence SEQ1 is partially known from the state of the art, and is a first step of the method of the invention. It is known from the prior art how a first collection of candidates can be made between a first device UE and a server SERV_IST, and then between a second device SERV_A and server SERV_IST, and finally between first device UE and second device SERV_A.

The method is particularly beneficial since this sequence SEQ1 involves an improvement compared to the prior art. The improvement relates to the fact that terminal UE communicates a history of candidates collected previously during previous connections between first device UE and second device SERV_A. This benefit, as described below, enables gateway NAT0 to be configured to guarantee continuity of operation of optimum quality, particularly in respect of the maintenance of the logical connection of the application session between the client and the server executing the application.

Step SEQ1 concerns the collection of candidates from server SERV_IST by terminal UE and by application server SERV_A.

At the outset, it should be noted that the candidates collected according to the application implemented and/or the media session which will be established can comprise at least one candidate, among which:
 a local IP address and a port;
 a private IP address of application server SERV_A and a port transposed by a gateway NATx in the network; this address is also noted the server's "reflexive address";
 a public IP address of application server SERV_A and a port transposed by a gateway NATx in the network; this address is also noted the server's "peer reflexive address";
 a relay address and a port of server SERV_IST when the TURN protocol is implemented.

In particular, the candidates of terminal UE comprise, for example:
 a local IP address and a port of the UE terminal;
 a private IP address of terminal UE and a port transposed by a gateway NATx in the network; this address is also noted terminal UE's "reflexive address";
 a public IP address of terminal UE and a port transposed by a gateway NAT0 in the network; this address is also noted terminal UE's "peer reflexive address"
 a relay address and a port of terminal UE relayed by server SERV_IST when the TURN protocol is implemented.

A first request REQ is generated by terminal UE to the ICE/STUN/TURN server, intended for example to recover an IP address and a port in order to be visible and accessible from a device connected to the INTERNET network beyond local network NET1. This operating mode corresponds to the operation of the STUN protocol in which the candidates are transmitted to terminal UE.

According to another implementation implying implementation of the TURN protocol, the candidates comprise the relay addresses of server SERV_IST. In this latter case the relay interfaces of server SERV_IST are used to reach a third-party device. This implementation is not described in detail; however, the method of the invention also relates to its implementation. Those skilled in the art can easily adapt the steps of the invention for implementation of a configuration involving a TURN protocol.

In an implementation in which the STUN protocol is implemented in the step of collection of candidates, a step which is also called the "ICE candidates collection" step, the candidates comprise at least one IP address and one port.

In this collection step, request REQ seeking to request the candidates from server SERV_IST can comprise the collection of several candidates to implement different media sessions between terminal UE and one or more application servers SERV_A. These candidates are returned in a message by server IST to terminal UE and to server SERV_A, in particular in another step of collection initiated by server SERV_A.

After this, terminal UE can exchange the candidates with gateway NAT1 of its local network. Gateway NAT1 is able to use, in particular, the candidates to define a public address, and to update the table of correspondence between the public and private addresses of the devices in local network NET1. Terminal UE comprises a client IS_CLIENT enabling the information enabling a transmission channel to be established with a third party which comprises a similar client, to be obtained. The source IP address and the port can be generated in the headers and as required in the bodies of the messages sent to a third party outside local network NET1.

Sequence SEQ1 comprises a similar step of collection of candidates by application server SERV_A from server IST or from a duplicated server SERV_IST.

UE-SERV_a Exchange of Candidates

It should be noted that the candidates can relate to different media sessions, different applications, a signalling protocol and/or the IP addresses and ports of the interfaces, etc.

For example, an application connection defining an application session established between terminal UE and server SERV_A can require that the candidates are transferred from terminal UE to server SERV_A, and vice versa. Consequently, according to the application, the choice and configuration of the transmissions of candidates between the two entities are generated by the client and the service executing the application.

Sequence SEQ1 therefore comprises a step SBR of exchange of candidates between terminal UE and application server SERV_A.

When terminal UE transmits candidates and a history of them to server SERV_A, this results in the transmission of the reflexive address of server SERV_IST between configurable gateway NAT0 and first gateway NAT1.

More accurately, according to the method of an embodiment of the invention, this sequence SEQ1 comprises a transmission by first entity UE of a history of candidates attributed to first entity UE, to application server SERV_A. This history comprises the various allocations of addresses which terminal UE has previously used, such that the server can use them to configure configurable gateway NAT0 as required.

Validation of Peers

This sequence SEQ1 also comprises a step of verification CHKc of the channels between peers of candidates established between first entity UE and application server SERV_A. This step consists in verifying the peering of the candidates by testing the IP connection or the signalling connection, for example established using a SIP protocol. Finally, the application session can also be verified.

When all the connections are established, the method of the invention implements a step of validation of their connectivity. As an example, a STUN request: "STUN Binding Request" can be transmitted from terminal UE to server SERV_A for each candidate.

Server SERV_A returns a reply, such as for example a "STUN BINDING RESPONSE". This step enables the discovery of the peer reflexive address of terminal UE, i.e. M_UE:m_ue, as assigned by gateway NAT0.

Server SERV_A is then able to transmit a public address of the server generated by configurable gateway NAT0 noted AR-P.

After this first sequence SEQ1, terminal UE and application server SERV_A are able to reach one another provided the candidates, i.e. the addresses and ports of the third-party device, are known to the devices in their local network, respectively NET0 and NET1.

Second step C1/SA1 of the method then starts, and ends with the establishment of an application session SA1 in transmission channel C1. When the connections between terminal UE and application server SERV_A are made, gateways NAT1 and NAT0, which are traversed, transpose the local addresses into public addresses. Client IS_CLIENT, associated with an application of a device, enables the addresses of the necessary fields to be generated in the headers and bodies of the packets which are transmitted to the third-party device in order to be correctly "seen" and reached by this third party.

Second Step: C1/SA1

FIG. 4 represents the second step of the method of the invention C1/SA1 comprising the establishment of a transmission channel C1 and an application session SA1 between application server SERV_A and terminal UE. In the example of FIG. 4, the process of establishing channel C1 implements a SIP signalling protocol for the implementation of an application session SA1 comprising a request and a response. It should be noted that the invention is not confined to the implementation of the SIP protocol, and that it also relates to any type of protocol other than the SIP protocol. This may concern, for example, an INVITE request of the SIP protocol enabling a client to request a new session; it may also concern a REGISTER request enabling a client to be registered with a service of the server, or of another server. When these exchanges are established, the method of the invention enables the previous SIP candidates to be transmitted to application server SERV_A. In this case, terminal UE and the application are configured to transmit the history of the previously used candidates to application server SERV_A.

In addition to the history of the candidates, the process of establishing transmission C1 can also comprise the previous identifiers of applications or the SIP identifiers, or any other candidates, which have been exchanged between terminal UE and server SERV_A. As was seen above, in connection with the implementation of the SIP protocol in the invention, the previous SIP identifiers, used to establish previous connections between terminal UE and server SERV_A, can be transmitted in this history.

Application server SERV_A can transmit a response to terminal UE intended to finalise the establishment of a transmission channel C1 and of application session SA1. If the SIP protocol is implemented, an OK response can be transmitted by SERV_A. The body of the message can be formalised using an XML or SDP protocol, or any other protocol enabling a data stream to be transmitted from one communicating entity to another.

The process of establishing the transmission channel can comprise the implementation of a plurality of peers of connections, corresponding to a plurality of active protocol layers between terminal UE and application server SERV_A.

It is of interest to transmit a public address AR-P of server SERV_A to terminal UE and/or to gateway NAT1 which remains identical, bearing in mind that processing the candidates collected from past connections using the method of the invention will enable a logical connection to be retained. In particular, this possibility enables the same AR-P address to be associated with new detected candidates of a device which has already previously established a connection with application server SERV_A.

Indeed, the public address of terminal UE can potentially change, for example when terminal UE is seen or detected by another local network NET2. A particularly interesting effect obtained by the invention lies in the maintenance of at least one application session which can be implemented due to the configuration of the configurable NAT.

The method of an embodiment of the invention comprises a third DETECT step, the consequence of which is that configurable gateway NAT0 is able to become aware of terminal UE from a physical connection other than the connection which was previously established in the second step, in particular in respect of the source address which is attributed to it by a second gateway NAT2 or possibly by first gateway NAT1, when this new physical connection is the result of a disconnection.

At least two implementations of the invention can be distinguished, which correspond to two types of conceivable scenario.

In a first case terminal UE detects or is detected by a second local network NET2.

The method of the invention enables a switch of at least one application session of a first transmission channel to a second transmission channel, where the channels connect terminal UE to an application server SERV_A.

In a second case terminal UE is disconnected from the first network for some reason, and is then reconnected. In this second case the step of collection of the candidates from server SERV_IST should be repeated.

The purpose of these two modes is to re-establish a second physical connection between terminal UE and application server SERV_A. The first mode is therefore described in the remainder of the description. Those skilled in the art would easily adapt the first mode to the second mode.

When terminal UE detects a second local network NET2, such as, for example a WIFI network, client IS_CLIENT of terminal UE collects candidates for a second time from server SERV_IST through gateway NAT2. This step is represented in FIG. 7. The steps previously described in sequence SEQ1 are similar to the steps taken by terminal UE with server SERV_IST. The previous candidates attributed to terminal UE are therefore retransmitted in this sequence SEQ1; they complete a history of candidates previously collected by terminal UE.

When second transmission channel C2 is established, this step is represented in FIGS. 8 and 9; the candidates are exchanged between terminal UE and server SERV_A. This step is similar to the exchange of candidates made in order to establish channel C1.

Application server SERV_A can transmit to configurable gateway NAT0 data relating to the collected candidates and to the history of these candidates from the establishment of second channel C2. The method of the invention then comprises a step of configuration of gateway NAT0.

According to a first implementation, gateway NAT0 can reconfigure these correspondence tables from the history of the transmitted candidates, and from a prioritisation algorithm hosted and implemented by gateway NAT0. The configuration of gateway NAT0 is active.

According to a second implementation, the correspondence table of the addresses of gateway NAT0 is updated from a setting generated by application server SERV_A.

Gateway NAT0 performs the calculations in order to reconfigure the tables of correspondences, in particular with the public addresses and the ports from data from SERV_A.

For example, this may relate to an application identifier or a SIP identifier. The configuration of gateway NAT0 is passive in this case.

The method of the invention relates to both these implementations.

In the first implementation, NAT gateway reconfigures its correspondence tables from the new candidates transmitted by terminal UE to server SERV_A and then transmitted from server SERV_A to gateway NAT0. The prioritisation algorithm implemented by gateway NAT0 enables it to be determined from the history of the transmitted candidates whether terminal UE has previously established an application session or a SIP discovery.

In the latter case, gateway NAT0 modifies these correspondence tables between public addresses and private addresses by transposing the public address of server AR-P as the source address of server SERV_A for new transmission channel C2, established between terminal UE and server SERV_A. It is of interest to retain the attributed identifiers or addresses in order to establish the application sessions between terminal UE and server SERV_A which were active via channel C1. One benefit is therefore that this offers continuity of service at the application level when changing from local network NET1 to NET2, for example when terminal UE is moving.

The invention claimed is:

1. A method of communication between a first communicating entity connected to a first network through a first NAT gateway of a first local network and an application server, where the application server is associated with a configurable NAT gateway enabling at least one address of at least the first NAT gateway to be made to correspond to at least one public address of the first communicating entity, called a peer reflexive address, comprising:
   establishing a first sequence of exchanges of candidates, where the candidates comprise at least one IP address and one port, comprising:
      collecting candidates by the first entity from a server using the ICE, STUN or TURN protocols in order to be reached by a remote server through the first NAT gateway;
      exchanging candidates between the first entity and the application server resulting in transmission of the peer reflexive address between the configurable NAT gateway and the first NAT gateway;
      transmitting to the application server by the first entity of a history of candidates attributed to the first entity;
      verifying channels between peers of candidates established between the first entity and the application server;
   generating a first transmission channel establishing a first application session;
   detecting by the first communicating entity of a new access network comprising a second NAT gateway or of a reconnection to the first access network after a disconnection, resulting in the establishment of a second sequence of exchanges of new candidates comprising steps similar to the first sequence;
   automatic configuring the configurable NAT gateway by a function of the application server so as to modify the correspondence between the source address of the first or second NAT gateway with the peer reflexive address of the configurable NAT gateway which is configurable from the history of the candidates sent by the communicating entity, and
   generating a second transmission channel between the first communicating entity and the application server ensuring that the first application session is maintained.

2. The communication method according to claim 1, wherein the candidates comprise, in addition to an IP address and a port number:
   an application identifier and/or;
   a SIP identifier.

3. The communication method according to claim 1, wherein the application session comprises an application identifier of the communicating entity associated with an application identifier of the application server, where maintenance of an application server implies that the association of the application identifiers is maintained.

4. The communication method according to claim 1, wherein the establishment of the first and second sequences of exchanges of candidates comprise, in succession:
   an exchange of candidates of a signaling protocol between the communicating entity and the application server;
   an exchange of candidates of an application protocol between a client of the communicating entity and a client of the application server;
   an exchange of candidates of a routing protocol between the first or second NAT gateway and the configurable NAT gateway.

5. The communication method according to claim 1, wherein the configurable NAT gateway comprises a clock enabling the periods over which no data is transmitted in the transmission channel to be determined, where the periods enables a priority indicator to be generated, assigned to a candidate stored in the configurable NAT gateway and associated with a terminal.

6. A communication system comprising an application server comprising at least one application client and one configurable NAT gateway, where the application server is configured to undertake an exchange of candidates with a remote communicating entity following a request through the configurable NAT gateway, where the configurable NAT gateway attributes a public address to the application server, called a peer reflexive address, where this address is associated with the remote communicating entity, so as to establish a first transmission channel ensuring that a first application session is established, wherein a new request for exchange of candidates comprising a history of the previous candidates received from a same communicating entity to the application server results in a configuration of the configurable NAT gateway, so as to modify the association between at least one transmitted candidate and the peer reflexive address of the configurable NAT gateway, and where the system establishes a second transmission channel between the communicating entity and the application server maintaining the first application session.

7. A communicating entity comprising at least one radio or network module enabling data to be transmitted over at least one interface of the said terminal connected to a network, where the communicating entity comprises a memory in which a history of candidates is recorded and associated with an application server, where the candidates are collected from a server using one of the ICE, STUN or TURN protocols, where the communicating entity comprises at least one calculator to insert in at least one frame of a SIP protocol a data field comprising the history of the collected and memorized candidates, as soon as a transmission channel is generated between the terminal and an application server, and where the communicating entity comprises two modems enabling the presence of at least two access networks to be detected, and two transmission channels to be generated in parallel, in which an application session established between the user terminal and an application server switches from one transmission channel to another whilst keeping the same session identifier.

* * * * *